T. R. HEMAN.
JUVENILE CART.
APPLICATION FILED MAR. 1, 1912.
1,092,992.
Patented Apr. 14, 1914.
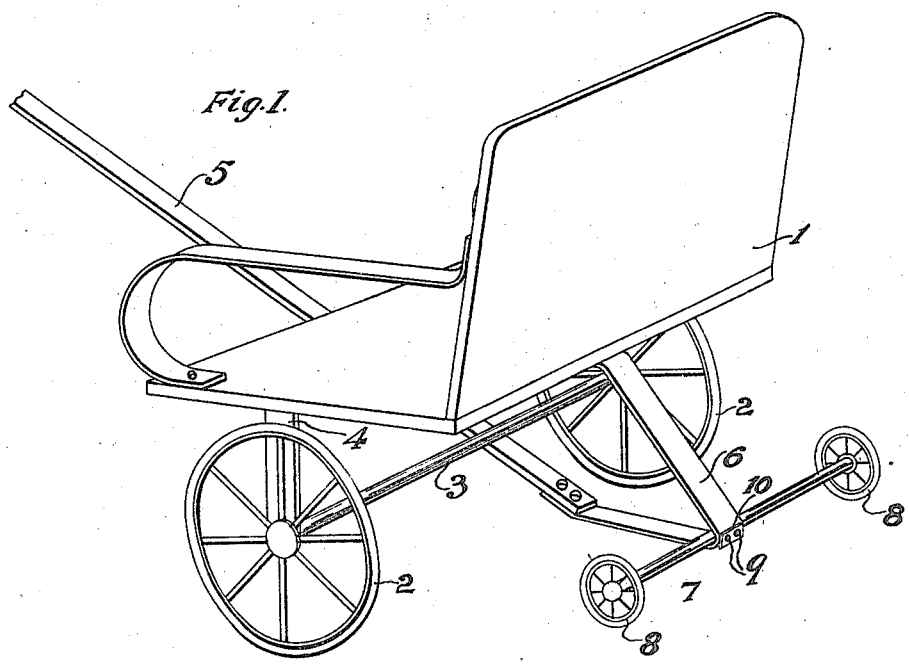
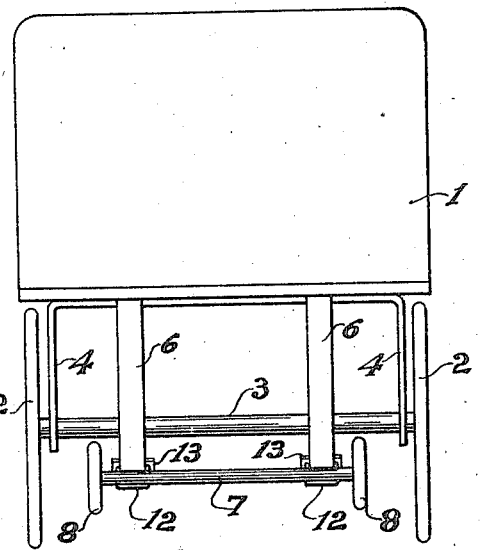
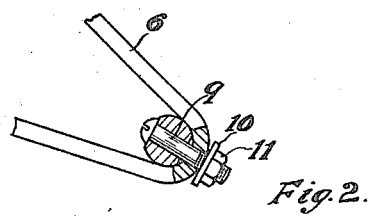
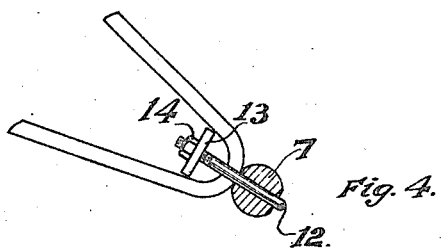
Witnesses
N. Brandt.
A. A. Olson.
Inventor
Theodore R. Heman
By Joshua R. H. Potts
his Attorney

UNITED STATES PATENT OFFICE.

THEODORE R. HEMAN, OF CHICAGO, ILLINOIS.

JUVENILE CART.

1,092,992.  Specification of Letters Patent.  Patented Apr. 14, 1914.

Application filed March 1, 1912. Serial No. 680,858.

*To all whom it may concern:*

Be it known that I, THEODORE R. HEMAN, a citizen of the United States, and a resident of the city of Chicago, county of Cook, and State of Illinois, have invented certain new and useful Improvements in Juvenile Carts, of which the following is a specification.

My invention relates to juvenile vehicles, and more specifically to a two-wheeled cart of this character.

The object of my invention is the production of a juvenile vehicle of the character mentioned, which will be of durable and economical construction and which will be adapted to effectually serve the purpose for which the same is designed.

Other objects will appear hereinafter.

With these objects in view, my invention consists in the combinations and arrangements of parts hereinafter described and claimed.

My invention will be best understood by reference to the accompanying drawing forming a part of this specification, and in which—

Figure 1 is a perspective view of a juvenile cart embodying the preferred form of my invention, Fig. 2 is an enlarged sectional detail of a portion of the construction shown in Fig. 1, Fig. 3 is a rear view of another form of cart to which is applied an attachment embodying the invention, and Fig. 4 is a sectional detail of a portion of the construction shown in Fig. 3.

The preferred form of construction, as illustrated in the drawing, comprises a cart consisting of the body 1 which is mounted upon wheels 2, the shaft 3 of said wheels being connected by supporting arms 4 which depend from the under side of the bottom of body 1. Projecting forwardly is the draft tongue 5.

In the form of cart shown in Figs. 1 and 2, a strap 6 is provided positioned centrally of the cart and projecting rearwardly and downwardly, said strap being bent upon itself with its respective extremities secured to the under side of body 1 and the rearward extremity of the tongue 5. Mounted in the rearward end of the strap 6, that is in the bight or vertex thereof, is a shaft 7 carrying small wheels or rollers 8 at its respective extremities. The shaft 7 is secured to the strap 6 through the medium of screws 9 which project through registering openings provided in said shaft and strap, the rearward ends of said screws passing through a perforated yoke 10 to which the same are connected by means of nuts 11 which are threaded upon said screws.

In Fig. 3 the cart is shown provided with two straps 6 instead of one, as shown in Fig. 1, the shaft 7 in this event being connected adjacent its respective extremities to the rearward ends of said straps, and if desired in the same manner in which the shaft 7 is connected with the strap 6 in the form shown in Fig. 1, as above mentioned. However, in Fig. 3 the shaft 7 is shown connected with the pair of straps 6 through the medium of U-shaped members 12, the parallel sides of which pass through perforations provided in said shaft for the reception thereof, said sides of the members 12 resting against the opposite edges of said straps and being connected by yokes 13 to which the same are secured by nuts 14 which are threaded upon said ends. If desired, it is understood that this form of connection of the shaft 7 with the strap 6 may be adopted in the form shown in Fig. 1, or where said shaft is secured to but a single supporting strap.

In either of the forms shown in Figs. 1 and 3 the wheels 8 are supported rearwardly of the body 1 and wheels 2, and in such a vertical position that, when the vehicle is in use, that is with the body thereof in upright position, the under sides of the wheels 8 will be elevated from the ground and so that only the wheels 2 will contact. The supplemental wheels 8 are provided to aid in drawing the cart over a gutter or down an abruption, such as a curbstone. In this event the cart will be tilted rearwardly until the wheels 8 contact with the ground, whereupon the wheels 2 may be raised or moved out of engagement with the ground to span the gutter or to lower the same to the lower surface at the abruption, thus preventing any jarring or other disturbance to the occupant of the cart. It is necessary that two supplemental wheels be employed, as shown, so as to maintain the cart in upright position or in stable equilibrium, when the latter is supported only by said supplemental wheels. Said wheels 8 also serve as stops which prevent backward upsetting of the cart. The wheels 2 and 8 are preferably rubber tired in order to conduce to ease and comfort for the occupant of the cart.

The supplemental wheels and the parts coöperating therewith for connecting the same with the strap or straps 6 are in the nature of an attachment, as will be observed, adapting the same for application to a cart of this character already in use as well as for incorporation in a cart simultaneously with the manufacture thereof.

While I have illustrated and described the preferred forms of construction for carrying my invention into effect, these are capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. In a device of the class described, an axle and coöperating wheels, in combination with a bracket mounted on said axle, a body fixed to said bracket, a strap having one end secured to said body and extending diagonally downwardly and rearwardly with relation to said body and rebent to form a forwardly extending arm, a handle bar attached to the lower free end of said strap and said handle bar and strap being unattached to said axle.

2. In a device of the class described, an axle and coöperating wheels in combination with a bracket mounted on said axle, a body fixed to said bracket, a strap having one end secured to said body and extending diagonally downwardly and rearwardly with relation to said body and rebent to form a forwardly extending arm, a handle bar attached to the free forward end of said forwardly extending arm, said strap being unattached to the axle and said handle bar being unattached to either the axle or the body.

In testimony whereof I have signed my name to this specification in the presence of two subscribing witnesses.

THEODORE R. HEMAN.

Witnesses:
ARTHUR A. OLSON,
JOSHUA R. H. POTTS.

---

Copies of this patent may be obtained for five cents each, by addressing the "Commissioner of Patents, Washington, D. C."